(12) United States Patent
Humphrey

(10) Patent No.: US 6,434,609 B1
(45) Date of Patent: Aug. 13, 2002

(54) COMPREHENSIVE GLOBAL INFORMATION NETWORK BROADCASTING SYSTEM AND METHODS OF DISTRIBUTING INFORMATION

(75) Inventor: Douglas Edward Humphrey, Laurel, MD (US)

(73) Assignee: Cidera, Inc., Laurel, MD (US)

( * ) Notice: Subject to any disclaimer, the term of this patent is extended or adjusted under 35 U.S.C. 154(b) by 0 days.

(21) Appl. No.: 09/267,658

(22) Filed: Mar. 15, 1999

Related U.S. Application Data

(63) Continuation-in-part of application No. 09/039,710, filed on Mar. 16, 1998, now Pat. No. 5,987,233.

(51) Int. Cl.$^7$ .............................................. G06F 13/00
(52) U.S. Cl. ..................................................... 709/218
(58) Field of Search ................................ 709/200, 202, 709/203, 204, 232, 235, 230; 711/100, 117, 118, 119, 122, 124, 136, 137, 141

(56) References Cited

U.S. PATENT DOCUMENTS

| | | | |
|---|---|---|---|
| 5,007,017 A | 4/1991 | Kobayashi | |
| 5,347,632 A | 9/1994 | Filepp et al. | |
| 5,434,994 A | 7/1995 | Shaheen et al. | ............ 709/223 |
| 5,442,771 A | 8/1995 | Filepp et al. | |
| 5,548,724 A | 8/1996 | Akizawa et al. | |
| 5,583,997 A | 12/1996 | Hart | |
| 5,588,060 A * | 12/1996 | Aziz | ............................ 380/30 |
| 5,592,626 A | 1/1997 | Papadimitriou et al. | |
| 5,619,654 A | 4/1997 | Mukai et al. | |
| 5,623,656 A | 4/1997 | Lyons | ............................ 707/10 |
| 5,633,933 A | 5/1997 | Aziz | |
| 5,644,714 A | 7/1997 | Kikinis | |
| 5,649,103 A | 7/1997 | Datta et al. | |
| 5,657,450 A | 8/1997 | Rao et al. | |
| 5,727,129 A | 3/1998 | Barrett et al. | |
| 5,781,909 A | 7/1998 | Logan et al. | |
| 5,924,116 A * | 7/1999 | Aggarwal et al. | ........... 709/204 |
| 6,038,594 A | 3/2000 | Puente et al. | |
| 6,243,760 B1 * | 6/2001 | Armbruster et al. | ......... 709/243 |

FOREIGN PATENT DOCUMENTS

| | | |
|---|---|---|
| WO | WO 98/17039 A1 | 4/1998 |
| WO | WO 99/12312 A1 | 3/1999 |
| WO | WO 00/30367 A2 | 5/2000 |
| WO | WO 00/42519 A1 | 7/2000 |
| WO | WO 00/46682 A1 | 8/2000 |
| WO | WO 00/49492 A1 | 8/2000 |

OTHER PUBLICATIONS

Gwertzman, J., "Autonomous Replication in Wide–Area Internetworks", (Apr. 1995), *Thesis / Harvard College,* Cambridge Massachusetts, pp. 1–100.

(List continued on next page.)

*Primary Examiner*—Robert B. Harrell
(74) *Attorney, Agent, or Firm*—Cooley Godward, LLP

(57) ABSTRACT

The comprehensive global information network broadcasting system and implementation thereof is designed to be used to provide a plurality of, what is commonly referred to as, Internet service providers with updated information through the use of high speed satellite links directly to the local Internet service provider from a centralized location. The satellite broadcasting system is combined with servers known as caching or proxy servers located at the client site which serve to store web and other data until the end user needs to access the data and a master cache center which coordinates the selection and transmission of information to those client sites via the satellite broadcasting system. The caching of data objects as close to the end user as possible will require less data to transit the backbones networks. The client site cache communicates to the master cache center via a connection to the Internet and the client site cache receives from the master cache center via the satellite broadcasting system and, in some cases, the Internet connection. Upon the receipt of a request from an Internet service provider, the information at the master cache will be transmitted from a ground station to a satellite and will be broadcast to all receiving Internet service providers using the broadcast system which overlays a capability onto the existing Internet that will allow real broadcast so that the data object can be transmitted once and received at all subscriber locations.

21 Claims, 4 Drawing Sheets

OTHER PUBLICATIONS

Bestavros, A., "Demand–based Document Dissemination for the World–Wide Web", (Feb. 7, 1995), Computer Science Dept/Boston Univ., pp. 1–22.

Weinstein, S., "The Role of Satellites in Internet Multimedia Applications" (Sep. 23–27, 1996) *Proceedings of ICSC '96*, pp. 14–20.

INTELSAT Internet Technical Handbook, http://www.INTELSAT internet Technical Handbook.ht, (May 8, 1997), pp. 1–37.

Nakayama, M., et al. "A Satellite Communications System For Interactive Multimedia Networks", *IEICE Trans. Commun.*, (Jan. 1997), E80–B:1:103–108.

Inoue, H., et al., "An Adaptive WWW Cache Mechanism in the AI3 Network", *Proceedings of the INET '97, Internet Society*, (1997), pp. 1–10.

Zhang, Z., et al., "Satellite Communications in the Global Internet: Issues, Pitfalls, and Potential", *INET '97*, (Jun. 24–27, 1999), pp. 1–13.

Danzig, P., "NetCache Architecture and Deployment", (Feb. 2, 1997), pp. 1–10.

Wessels, D, et al., "ICP and the Squid Web Cache", (Aug. 13, 1997), pp. 1–25.

Oakes, C., "Can Caching Tame the Web?" (Mar. 19, 1998), pp. 1–4.

Internet Skyway—for the press, http://www.internet–skyway.com/press1.html, (Mar. 10, 1998), pp. 1–2.

Tewari, R., et al., "Beyond Hierarchies: Design Considerations for Distributed Caching on the Internet," *Dept. Computer Science,* University of Texas at Austin, (Feb. 1998).

Touch, J., et al., "The LSAM Proxy Cache—a Multicast Distributed Virtual Cache," USC/Information Sciences Inst., (Aug. 1998) pp. 1–7.

Chen, H., et al., "Wormhole Caching with HTTP PUSH Method for a Satellite–Based Web Content Multicast and Replication System," Proceedings of the $4^{th}$ International Caching Workshop, San Diego, (Mar. 1999).

Mathur, A., et al., Adding Intelligence to Satellite–Based Internet Links: Architecture of a Second–Generation Satellite–Based Internet Delivery System, Procedings of the INET '99, pp. 1–18.

Gwertzman, J., et al., "The Case for Geographical Push–Caching," *Division of Applied Sciences,* Harvard University, (1995).

Gwertzman, J., et al., "An Analysis of Geographical Push–Caching," pp. 1–20 (1995).

Rickard, J., et al., "Editor's Notes—A Cache and Carry Internet," Boardwatch Magazine, (Feb. 1998).

* cited by examiner

COMPREHENSIVE GLOBAL INFORMATION NETWORK BROADCASTING SYSTEM AND METHODS OF DISTRIBUTING INFORMATION

This application is a continuation-in-part of U.S. patent application Ser. No. 09/039,710, filed Mar. 16, 1998, now U.S. Pat. No. 5,987,233, incorporated by reference in its entirety.

TECHNICAL FIELD

This invention pertains to global information networks, currently referred to as the Internet or Internet systems, and in particular, to a system for providing a comprehensive global information network broadcasting system and the methods of implementing the same using broadcast links to overcome the limitations in network distribution and caching systems inherent in conventional designs.

BACKGROUND OF THE INVENTION

The explosion of the use of Internet and other similar systems has created massive performance demands on the Internet Protocol (IP) and the communication infrastructure associated with the Internet. The areas which are experiencing this communication and application explosion may include any IP network or Internet, public or private, or any group of computers connected together. The present invention has particular application in the current system referred to as the Internet.

The performance demands on the network are further compounded by the inherent limitations in the IP network architecture and the popularity of certain applications on the network. Some of the most popular applications on the Internet, such as the web browser, construct, or attempt to construct, a point-to-point or end-to-end connection across the network. With the Internet browser application, the Internet participant "points" the web browser to a universal resource location ("URL") address which, in turn, the browser uses to attempt to connect to the network and display the information at the URL address.

An end-to-end connection across the network makes network performance parameters such as latency and network queuing delays into factors that dependent, at least in part, on each link in the point-to-point chain of connection. Since IP also has inherent data concentration characteristics, the performance of the network may be significantly degraded by traffic concentration on the network backbones. Thus, network performance, e.g., network latency, is often dominated by the latency of the most congested link. Thus, a problem in the conventional IP network is that "end-to-end" latency may be dominated by the link with the greatest congestion. Data concentration may cause a high latency on over-subscribed backbone links.

A problem related to network congestion and data concentration is the present rate of growth in the popularity of the Internet and it's applications. The present rate of growth makes increases in network performance, or even maintaining network performance, simply by increasing backbone size a problematic solution, e.g., at the current rate of growth in Internet usage, backbones and communication equipment may require replacement before their costs can be recovered. Thus, the conventional architecture and pricing structure for Internet service may not be self financing in some instances.

Another systemic source for network demand is the increase in the number of times that the network is being called upon to move the same data to multiple users. In practice this may be caused by the increasing popularity of particular website or the so called web portals.

The transport of redundant date problem has been addressed, in part, through the use of network caches. Network caches store data inside the network and service the user demand for data from data stored in the cache. Thus, network caches may reduce the number of identical items which are being passed end-to-end through the network by locally servicing the request for data from the local cache. The success of the network cache, however, is hampered by the fact that the ideal location, or optimal position, for the cache (or caches), is at the edge of the network infrastructure as close as possible to the end user. Thus, the optimal positioning of caches, near the edge of the network, inherently presents communication and coordination challenges.

Caching at the edges of the network, e.g., using many small caches at the network edges rather than a few large central caches at the center of the network, is further complicated by the fact that the small caches may have a limited cache community size. A limited or small cache community size means that there are few users using any one cache. A small cache community size is typically associated with a small number of request for information which makes it difficult, if not impossible, to mathematically achieve a high cache hit rate.

The cache hit rate is a mathematical term that expresses the number of hits encountered in the use of the cache per 100 requests for information. A high cache hit rate means that a high percentage of user requests are serviced by the cache. This means that the cache is working to reduce the load on the network. The cache hit rate, however, is dependent upon the number of users of the cache or members of the cache community. Thus, an engineering trade-off exists in the conventional cache design, i.e., a cache is more useful at improving latency at the edge of a network but the cache will, on average, have a lower hit rate because of the small cache community size.

Another problem in the conventional network is the level of general broadcasting that can be accomplished within the conventional architecture. As the Internet was established, the vast majority of network traffic was point to point in nature. In the present network, however, broadcast data on the network has surpassed other forms of traffic in terms of volume, but the network continues to have a point to point architecture which does not provide the physical medium or logical structure to implement broadcast within the network. The result is that the Internet is choking itself with replicated data, moving thousands of copies of the same data around at any given moment in time. The major difference now and when the network originated is the increased size of the transmission lines and switch capacity which are able to move more data. The IP network, however, is still using the same basic architecture as was found in the original system.

Another factor that effects network performance is that most of the data on the Internet is accessed infrequently. A small proportion of the data available on the Internet is receiving the majority of the inquiries or "hits" on the system.

There have been a number of attempts to improve network performance. One way of approaching the problem is by employing larger capacity storage equipment and/or faster communication equipment. This may provide faster network response time and/or ameliorate network congestion and delays in the short term. Indeed, the continuing availability of larger capacity and lower cost storage technology have made this a cost effective short term, however, stop gap, approach to network congestion. As discussed above, the rate of growth in the Internet's popularity may require equipment replacement before equipment costs can be recovered. Also, a number of United States Patents describe attempts to improve speed and storage capacity of interactive networks through a number of different methods—those patents include U.S. Pat. No. 5,442,771 issued to Robert Filepp et al. for a "Method For Storing Data In A Interactive Computer Network" and the patent issued to Ashar Aziz, U.S. Pat. No. 5,588,060 for a "Method And Apparatus For A Key Management Scheme For Internet Protocols."

SUMMARY OF THE INVENTION

It is the goal of the present invention to address these short falls and problem areas to improve performance of the Internet. Thus, a first object of the present invention is to achieve real improvement in the performance over conventional caching system design through the use of a novel and nonobvious scheme to increase the local cache hit rates by employing methods and apparatus to improve the selection of data for storage in a local cache.

Another object of the present invention is a way to mesh a broadcast architecture into the point-to-point architecture of the Internet to enable the network to achieve the advantages of a broadcast architecture while maintaining the benefits of a point-to-point network.

Another object of the present invention is to combine the methods and apparatus for improved cache performance with the methods and apparatus used to mesh a broadcast architecture onto the point-to-point network architecture to achieve a complementary result.

Another object of the present invention is to extrapolate global demand for information into a tangible and practical solution to select data for storage into local cache devices thereby improving cache performance for caches with a small cache community size.

Another object of the present invention is the extrapolation of a statistically relevant sample from a list of requests for information that may modify a threshold of interest parameter for the selection of information into a local cache.

Another object of the present invention is to modify a threshold of interest in the selection of data of interest for input into a local cache based at least in part on historical interest in local demand for said data over a predetermined window of time.

Another object of the present invention is the employment of a proactive way to select data for input into a local cache in anticipation of network demand for said data of interest.

Another object of the present invention is the directed selection of information into particular local cache to achieve improvements in local cache performance.

Yet another object of the present invention is the deployment of a fee based broadcast service that improves local cache performance which in turn allows Internet service providers to achieve a greater return on investment in communication equipment and frees up network capacity to add additional Internet subscribers.

These and other objects of the present invention, as discussed in detail below, will become apparent to those skilled in the relevant art upon disclosure of the inventions and teachings contained herein.

A way to improve the Internet's performance is to improve the cache hit rate for at least some of the caches in the network. When a cache services the user's request for information, the network conserves capacity because an end-to-end connection is not required to service the request. A novel way to improve the selection of data for storage in a local cache is to determine the interest in the data on the network as a whole or as a sample determining the popularity as a whole. This may be accomplished by a system that measures the number of access requests for information and the type of information that were not available on the local caches. These can be called local cache miss information. The system may then examine the local cache miss information from some or all of the local sites and determine what information is of global interest to the Internet community. The system may then determine by a variety of ways discussed further below what information is a good selection for storage into local caches. Thus, the system provides a way to determine the selection of information for storage into a local cache from a pool of local cache miss information.

A second element that may improve the operation of the Internet is a broadcast system which takes the information or data that has been determined to be of sufficient interest that it is useful to input into local caches and broadcast that information and data to the local cache systems. This action may relieve the network from the identified problem of transporting replicated data and redundant information across network backbones. This high speed cache update or broadcast channel provides the network with fast relief from redundant data transport and will quickly reduce congestion across the entire Internet system.

The two methodologies of local cache sampling and broadcast cache updates complement and provide a synergistic solution to each others individual weaknesses thereby allowing the two technologies to blend into a single unique solution to the problems described herein. For the problem of multiple identical data elements traversing the Internet, caching represents a good solution but because of the tradeoff issue of small cache community sizes not providing high hit rates and the optimal positioning of the cache, caching is limited in its practical application. Satellite one-way broadcasting addresses this problem by, when combined with the data evaluation and selection that is described herein, aggregating cache community elements from all cache clients into one single cache community and thus allowing high hit rates to be achieved.

The use of satellite communications to provide a broadcast medium to the Internet may be accomplished by orbital satellites which allow a single signal to be sent up to a satellite and the resulting signal to be sent down to large geographic areas. A conventional satellite broadcast, however, settles from the fact that all users may not want to use the broadcast information at exactly the same time. The store and forward capability of a caches such that it accepts information and then store it for a time so that it can be used at times other than the exact time that it is broadcast, solves the major difficulty with satellite one-way broadcast.

This invention, inter alia, teaches a method for combining the capabilities of satellite communications and caching servers to overcome the disadvantages of each and, at the same time, improve the levels of hit rate that may be achieved by caching servers thereby saving bandwidth and other valuable resources within the Internet and other data networks which can use these technologies. This invention, inter alia, further teaches how to construct a selection system which uses one-way satellite communications in order to build a true broadcast capability as an addition to the existing point to point Internet network, and to use this broadcast capability to aggregate the cache community size, thus increasing the hit rates of caches on all caches which subscribe to the service without regard to a number of members of the individual cache server cache community size.

Thus, the present invention provides a complete comprehensive Internet broadcasting system that employs a caching system that is positioned close to the end user while still being part of the shared infrastructure and achieving a high cache hit rate. The system further provides a complete comprehensive Internet broadcasting system which seamlessly overlays a capability on the existing Internet that may allow a real broadcast so that the data or information can be transmitted once and received at the local caching systems.

This hybrid broadcast/cache architecture is very adaptable. Furthermore, the system is easy to install and readily available to all customers and Internet service providers. The system works with conventional cache systems, such as those available from Inktomi, Inc. and with conventional commercial satellite services such as GTE Spacenet or Hughes Satellite Systems.

Particularly, this invention, inter alia, teaches a method for implementing a comprehensive global information network broadcasting system, for use in overcoming inherent limitations in current global information network systems including the requirement for multiple copies of the same information or data being moved around the Internet to serve individual users along with the point to point nature of the infrastructure, comprising the steps of providing a master caching center for receiving information requests and sending out information and data; installing local caching systems for Internet service providers and customers sites; providing a satellite broadcast linking system to the local caching system for providing nearly instantaneous information from the master caching center to the local caching systems; disseminating a program for selecting data elements for storage in the local caching systems; and distributing data and information updates for the local caching systems as predetermined by the master caching center.

This invention, inter alia, also teaches a method of operating a comprehensive global information network broadcasting system, for use in overcoming inherent limitations in current global information network systems including the requirement for multiple copies of the same information or data being moved around the Internet to serve individual users along with the point to point nature of the infrastructure, comprising the steps of receiving a request for information or data from a customer to the local cache site; determining the location of the requested information or data among a number of location sources; notifying the master cache center of the lack of success in finding the requested data or information in the local cache system; analyzing the number of requests that the master cache center has received on a particular piece of information or data; retrieving the data or information from the Internet once the level of interest has been achieved; and sending the requested information or data through the satellite broadcasting system to all local cache sites once the data or information requests have reached a predetermined level.

This invention, inter alia, further teaches a comprehensive global information network broadcasting system, for use in overcoming inherent limitations in current global information network systems including the requirement for multiple copies of the same information or data being moved around the Internet to serve individual users along with the point to point nature of the infrastructure, comprising a master caching center for receiving information requests and sending out information and data; local cache systems positioned at customer and Internet service provider sites for sending out information and data requests and receiving and storing the information requested; means for connecting said master caching center with said local cache systems; and means for determining the level and interest in a particular piece of information or data and allowing the information and data to be sent from the master caching center to the local cache systems.

DESCRIPTION OF THE FIGURES

Further objects and features of this invention will become ore apparent by reference to the following description taken in conjunction with the following figures, in which.

DESCRIPTION OF THE PREFERRED EMBODIMENT

Figure 1:
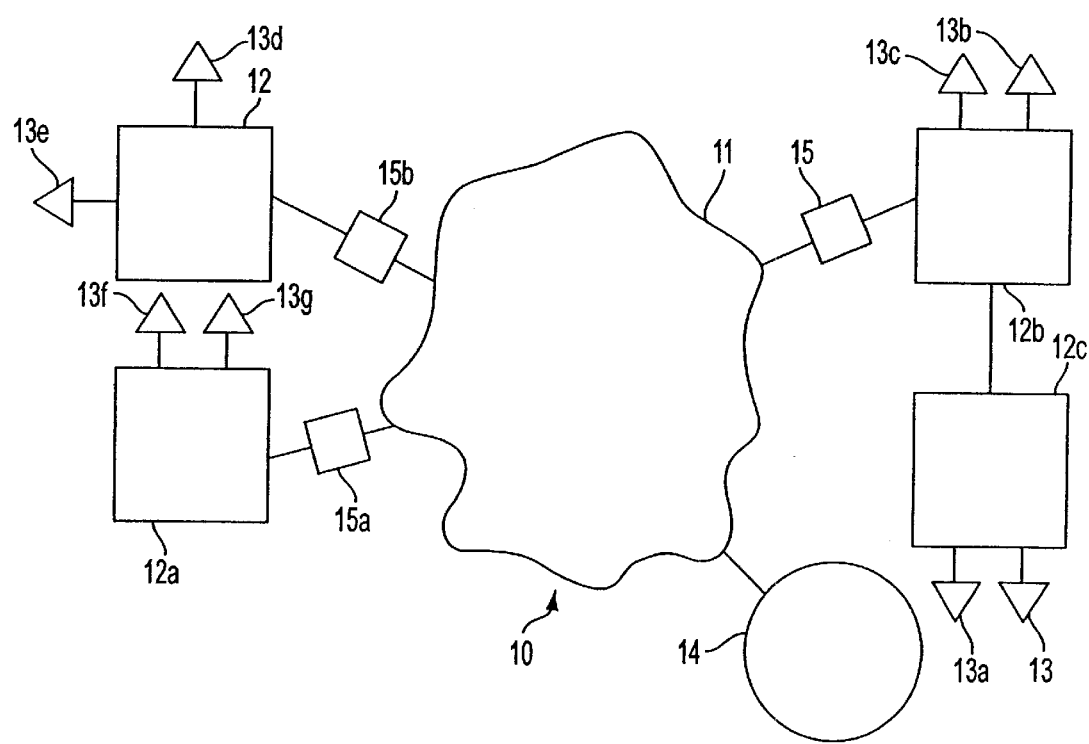
FIG. 1 is a system diagram for the current Internet system.

As shown in the figures, the conventional Internet system 10 (shown in FIG. 1) may be composed of an Internet highway 11 having a number of clients or Internet participants 12, 12a, 12b and 12c. The clients can be an Internet service providers or corporate customers and each one of these customers can have a large number of their own clients or internet participants shown as 13 through 13h. In a typical Internet application, a participant, for example participant 13, may request information from an information source 14. This request for information may originate at an application such as a web browser at the participant's 13 equipment. A URL request from the web browser may be output from the participant 13 and input into the participant Internet service provider 12c. The Internet service provider may then pass the request to another Internet service provider 12b. This Internet service provider 12b may pass the request through cache 15 to the Internet highway 11. The Internet highway 11 may then pass the URL request to the information source 14. The information source 14 may then formulate a response to the URL request from the participant 13 and send the response back over the network 11 through cache 15, through Internet service provider 12b, through Internet service provider 12c and to the user or participant requesting the information 13. In the conventional network, this end-to-end transmission of URL and URL response may be reported for each and every participant on the network. Thus, information from information source 14 may be redundantly transported to each participant.

If caches are activated and employed on the network 15, 15a and 15b, they may reduce the information flow across the network 11. In a simple illustrative example, internet participant 13 may request information from information source 14 as described above. Active cache 15 may store the information response from the information source 14 locally at the cache 15. When internet participant 13a, for example, requests the same information from information source 14, the request for information may be satisfied by the information stored in the cache 15. Thus, the request for information from the second participant 13a may be terminated and satisfied at cache 15, thereby reducing traffic across the network 11.

If caches 15 through 15b are located at positions around the net it may reduce the number of messages sent across the network. A problem, however, occurs in small systems, because caches in these small systems have very few (relatively) information requests. In order to work efficiently, cache's need to have cache community size large enough to have a substantial hit rate. The costs associated with conventional cache equipment prohibits cost effective implementation in small cache community applications. Another difficulty of the conventional system design is the network infrastructure. Given the fact that the information has to travel over point-to-point links, the only other way of speeding up the service, is to widen the lines or bandwidth. This solution, although feasible, has a finite limit and diminishing returns.

Figure 2:
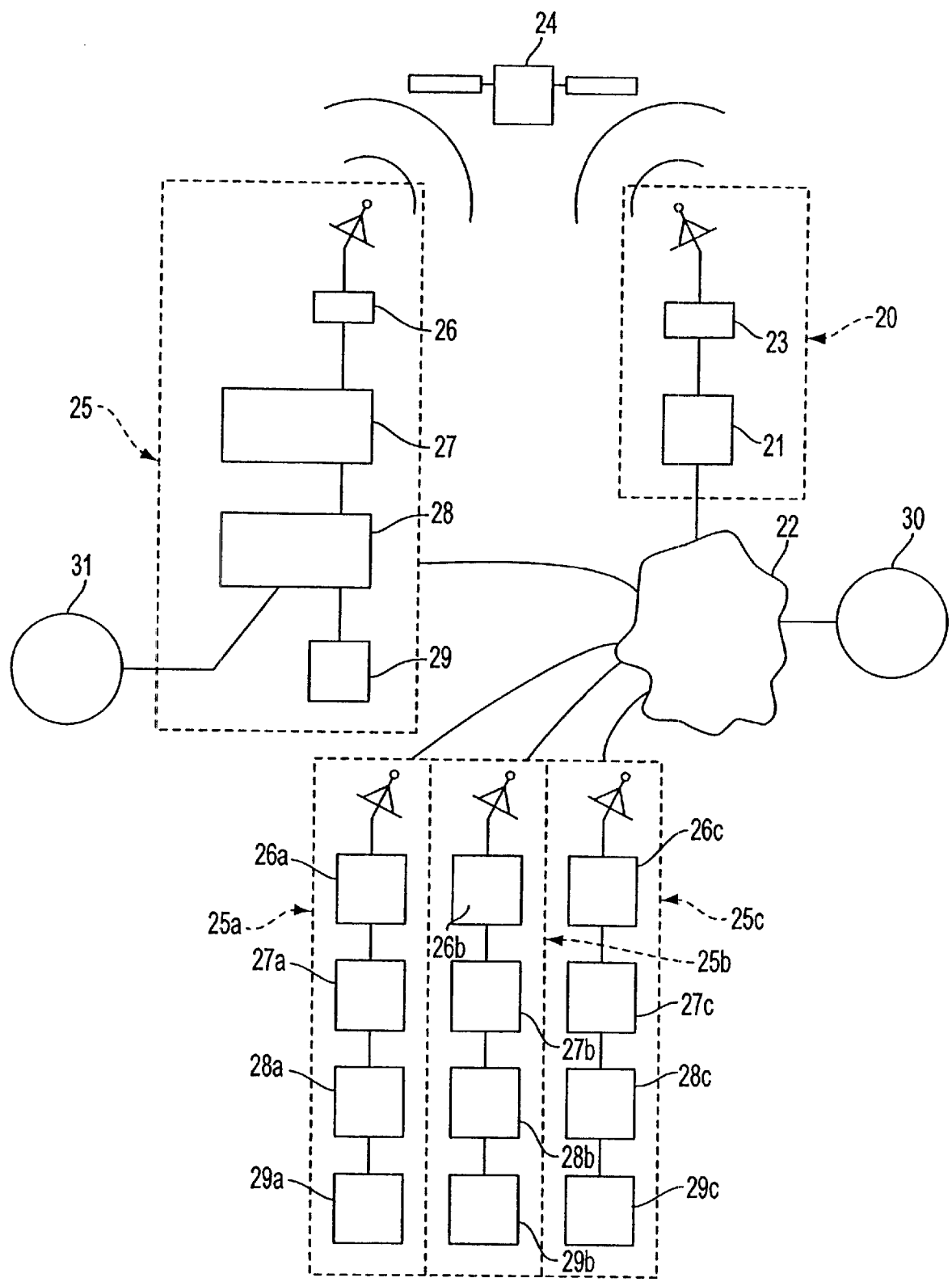
FIG. 2 is a system diagram for the novel comprehensive global information network broadcasting system.

An embodiment of the comprehensive Internet broadcasting system 20 is shown in FIG. 2. The system may be comprised of a master cache center 21 that is operationally connected to the Internet 22 and a satellite uplink transmitter 23 that may, in turn, uplink data to a geosynchronous satellite 24. Typically, four geosynchronous satellites are employed to effect planetary coverage low and near earth orbiting satellites, however, are within the scope of the present invention. The uplink transmitter 23 may be duplicated for each of the geosynchronous satellites employed for coverage. Thus, a land line, not shown, may transport the present data to a remote uplink site to provide access to other satellite regions.

The system may have a plurality of clients comprising Internet service providers or customers. Each of the clients may have a local cache system 25 through 25c which may be comprised of a satellite broadcast receiving system 26 through 26c, a cache adapter 27 through 27c and a cache 28 through 28c. The cache 28 through 28c may have a cache disk or cache storage device 29 through 29c for the storing of information and data received from the Internet or the broadcast system.

The system of the present invention may also be employed over high speed land lines and wireless terrestrial links. The system may maintain the advantages of a point-to-multipoint configuration through the use of high speed half duplex or asymetric communication equipment. The system may also benefit from direct connection into the high speed links available from network switches operators such as the SONET and/or DS-3 connections. Thus, it is within the scope of the present invention to establish the high speed connection from the master cache to local caches through terrestrial communication methods.

By way of illustrative example, the improved system may function by a customer 31 of the Internet service provider sending a message or a URL request to the local Internet service provider's cache system 25 requesting information or data. The Internet service provider's cache 28 may determine whether it has the current version of the information or data stored on its cache. The cache 28 may then check whether the information or data is located in the cache adapter 27. The cache adapter in this illustrative example, does not have the material because it does not yet store the information. The cache adapter 27 responds negatively to the request notifying the cache 28 to search elsewhere. The local cache 28 may then search other caches or the Internet for the requested information. The cache adapter 27 may send a message over the Internet to the master caching center 21 reporting the "miss" of the requested information. The master cache 21 may then record the information regarding the cache miss and measure the amount of interest in the information or data from the local caching systems 25 through 25c. The master cache 21 may employ a variety of methods described further below to determine at what point the level of interest is sufficient to broadcast the information or data to the Internet service providers caches.

The master cache 21 may obtain the requested information or data from a source 30 via the Internet 22. The master cache 21 may then compress the information for storage or transmission. The master cache 21 may assign a priority to the information based upon the levels of interest and a predetermined transmission formula as described below. The information or data may be broadcast to the satellite 24 which may, in turn, broadcast to the satellite receivers 26 through 26c of the Internet service providers or customers. After the information is received by the satellite receiver 26, it may be passed to the cache adapters 27 through 27c. The cache adapters 27 through 27c may then formulate a user request for the data for the local cache 28 through 28c to find the information. This action may cause the local cache 28 through 28c to search for the data. This time, the local cache may find the information or data at the cache adapter 27 through 27c. The local cache 28 through 28c may then transfer and store the information on the cache storage disk or storage device 29 through 29c. In another interface made of the invention, the cache adapter 27 may directly transfer information to the cache file system.

Figures 3, 4:
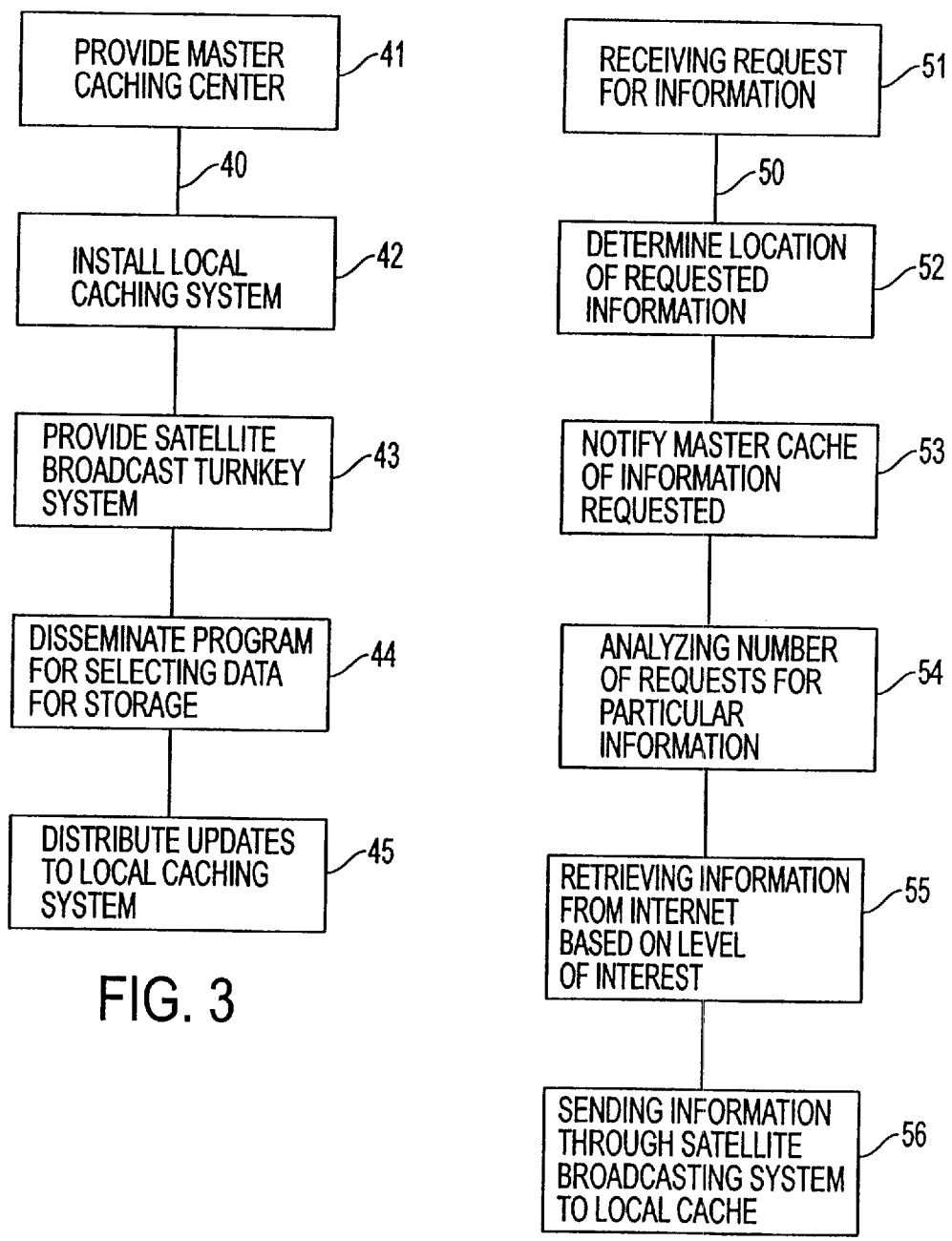
FIG. 3 is a block diagram of a method of implementing a comprehensive global information network broadcasting system.
FIG. 4 is a block diagram of a method of operating a comprehensive global information network broadcasting system.

Referring now to FIG. 3, the novel method for implementing a complete comprehensive Internet broadcasting system 40 may be comprised of the following steps: providing a master cache center for receiving information requests and sending out information and data 41; installing local caching systems for Internet service provider and customers sites 42; providing a satellite or wideband broadcast linking system for connecting the local caching systems in order to provide nearly instantaneous information and data from the master cache center to the local caching systems 43; disseminating a program for selecting data elements for storage in the local caching systems 44; and distributing data and information updates for the local caching systems as predetermined by the master caching center 45.

Referring now to FIG. 4, a novel method of operating a complete comprehensive Internet broadcasting system 50 may employ the following steps in its process: receiving a request for information and data from a customer to the local cache site 51; determining the location by the local cache site of the requested information or data from a number of locations sources 52; notifying the master cache center of the lack of success in finding the requested data or information in the local cache 53; analyzing the number of requests that the master cache has received for a particular piece of information or data 54; retrieving the data or information from the Internet 55; and sending the requested information or data through the satellite broadcasting system to all the local cache sites once the data or information requested has reached a predetermined level 56.

Figure 5:
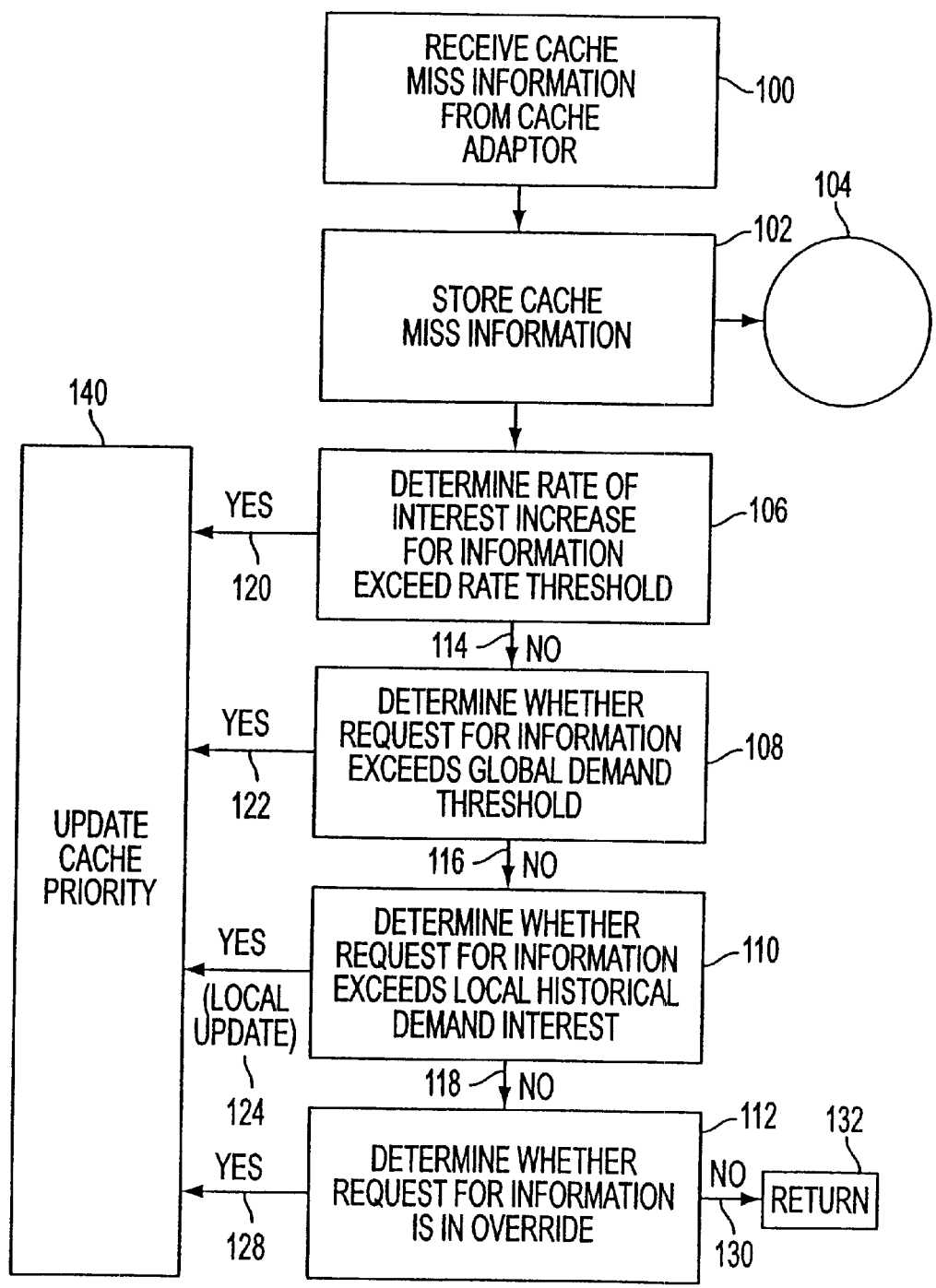
FIG. 5 is a representative block diagram of the cache update procedures.

FIG. 5 depicts a representative block diagram of the procedures and methods that may be used to determine cache update priority. The procedure may receive cache miss information from the network cache adapters 100. It is understood that cache adapters 27 may be deployed as part of a subscription service to the cache update broadcast of the present invention. Each site, however, is not required to have a cache adapter that reports to the master cache. So long as enough cache adapters are deployed and reporting cache miss information to the master cache to provide a statistically relevant sample of Internet participant demand for Internet information, or through some other feedback methodology, it is within the scope of the present invention.

Once the system receives the cache miss information 100 the system may store the miss information in a volatile or non-volatile storage device 104. This may provide a non-volatile storage record for the threshold calculations described below.

The first threshold of interest factor that may be employed by the present invention is determining whether requests for information exceed a predetermined rate 106. The rate of request for information can be determined by collecting information as to the time at which the request for information was received by the system. When the rate of requests for information exceeds a predetermined number over a predetermined time, for example 10 minutes, the system may designate the information for broadcast 120. If the rate of the requests for information does not exceed the predetermined threshold, the system may pass the request for information to the next rule 114.

The next rule the system may use to determine whether to broadcast the information to the subscriber caches is to determine whether the request for information exceeds a global demand threshold 108. In this rule, the system may determine whether the request for information exceeds a predetermined number for overall demand. This parameter may identify web pages that provide a consistent long term level of interest. If the request for information exceeds this threshold, then the information is designated for broadcast to the subscriber caches 122. If the request for information does not exceed this predetermined threshold then the system may pass the request for information to the next rule.

The next rule determines whether to designate the information for broadcast to a local cache based on localized demand for the information. It is within the scope of the present invention to store cache miss information that identifies which subscriber cache is reporting the cache miss information. The system may then use a predetermined threshold for localized demand. For example, from the rules described above, which are herein incorporated by reference, to designate whether the information should be broadcast to a local subscriber cache 124. Thus, it is within the scope of the present invention to update a local subscriber cache by uniquely addressing a local cache adapter for the broadcast cache update. In a first unique addressing mode, a conventional satellite receiver may be addressed to receive a unique satellite broadcast. In a second unique addressing mode, the present invention may address the cache adapter through conventional protocol addressing techniques. If the local information threshold rule 110 is not exceeded, then the system may pass the information request to the next exemplary rule 118.

The next exemplary rule 112 may determine whether the request for information is subject to a heuristic override 112. The heuristic override rule may determine whether a system operator has manually designated information for broadcast. If the information has been designated for broadcast, the system will schedule the information for broadcast 128. If the information has not been designated for broadcast, the system may procedure terminate and return 132. the system may execute an override rule that does not pertain to the request for information passed via the other rules. It is understood that the system override rule may immediately schedule information for broadcast to the local subscriber caches.

The system may employ a priority scheme to broadcast cache update data 140. The priority scheme may use a first in first out rule or a weighted priority scheme to allow higher priority updates such as information designated from 120, which may designate a rapid increase in demand, for broadcast to the subscriber caches.

The above described methods and technologies improve the operation of the Internet by increasing the hit rate of the local cache sites by combining them into a single cache community which can then aggregate its usage and significantly improve the hit rates to the benefit of the Internet service provider or end user organization. The elements designed into the system that result in the improvements include the use of a cache adapter at each of the local cache sites. This adapter is informed when the local cache site has been asked for information or data and is also informed that the local cache site did not have the information and data. This is important because if a local cache site doesn't have the information or data, it requires the local cache sites to seek the information in the Internet and then to place that information in the local cache site.

The adapter communicates the miss information with the master cache center. The master cache center analyzes the miss data from all the local cache sites and determines the information and data that are of a sufficient interest to the Internet community, using the companion software program described below to do so. This determines the information and data that warrants having the information and data sent by means of the satellite connection and thus being placed in all of the local cache sites in the system.

Controlling the amount of information and data being sent to the local caching sites may be useful because of the nature of the information and data being delivered. Much, if not a majority of the information and data available on the Internet may be considered archival or data which is accessed so seldom as to make it not desirable to have cached in multiple locations. Active material are items that have a regular level of interest and is of some benefit to have some degree of local site caching. Popular material which is accessed regularly is worth caching. Intensive (frequently updated) material is of questionable value caching because it is changed so often. The factor that is under the control of the software program described below is that the material being sent to the local caching sites should provide value to the Internet service providers or end user.

A number of processes can be used to improve the system. This could include having the master cache center pre-stage information or data that has been requested. This process allows the master cache server to obtain the information or data even before the evaluation has been done to determine whether it will be sent up to the satellite. This will minimize the time delay experienced once the determination has been made that the information or data meets the criteria to be transmitted to all local caching sites. The system would also use a predictive model to position large information items that do not change frequently and have regular levels of interest.

While I have described my invention in connection with specific embodiments thereof, it is clearly to be understood that this is done only by way of example and not as a limitation to the scope of my invention as set forth in the objects thereof and in the appended claims.

I claim:

1. An information distribution method in a master caching system, comprising:

receiving information from one or more local caching systems, said received information reflecting user interest in information content;

inferring, based at least in part on said received information, a level of interest by users served by a local caching system beyond said one or more local caching systems;

retrieving said information content; and distributing said information content to said second local caching system via a satellite broadcast linking system when said level of interest has reached a threshold level.

2. The method of claim 1, wherein said information content is retrieved via the Internet.

3. The method of claim 2, wherein said retrieving occurs prior to said level of interest reaching said threshold level.

4. The method of claim 2, wherein said retrieving occurs after said level of interest reaches said threshold level.

5. The method of claim 1, wherein said received information is information regarding a local caching system miss.

6. The method of claim 1, wherein said threshold level is a predetermined level.

7. The method of claim 1, wherein said distributing occurs prior to a request by said second local caching system.

8. An information distribution method in a master caching system, comprising:

receiving, from one or more local caching systems, messages indicative of user interest in information content at said one or more local caching systems;

determining a level of user interest based on said received messages; and distributing said information content via a satellite broadcast linking system to at least one local caching system beyond said one or more local caching systems when said determined level of user interest has reached a threshold level.

9. The method of claim 8, further comprising retrieving said information content via the Internet after said determined level of user interest has reached a threshold level.

10. The method of claim 8, further comprising retrieving said information content via the Internet before said determined level of user interest has reached a threshold level.

11. The method of claim 8, wherein said receiving comprises receiving information regarding a local caching system miss.

12. The method of claim 8, wherein said threshold level is a predetermined level.

13. A caching system, comprising:

a satellite broadcast system; and a master cache connected to a plurality of local caches, each of said plurality of local caches being connected to a respective plurality of users, said master cache being operative to receive a communication from a first local cache regarding a cache miss, retrieving information content referenced by said communication from said first local cache, and distributing said retrieved information content to a remaining plurality of local caches via said satellite broadcast system upon a determination that a level of interest in said information content has reached a threshold level.

14. The method of claim 13, wherein said retrieving is via the Internet.

15. The method of claim 13, wherein said distributing occurs after said determination.

16. The method of claim 13, wherein said distributing occurs prior to a request by said remaining plurality of local caches.

17. The method of claim 13, wherein said distributing occurs before said determination.

18. A network caching method, comprising:

receiving cache miss information from a first local cache at a master cache;

determining, at said master cache, a level of user interest based on said received cache miss information; and retrieving, in response to said received cache miss information, information content identified in said cache miss information from the Internet;

storing said retrieved information content in said master cache; and transmitting said retrieved information content from said master cache to a plurality of local caches beyond said first local cache when said determined level of user interest has reached a threshold level.

19. The method of claim 18, wherein said retrieving occurs in response to said determination.

20. The method of claim 18, wherein said transmitting occurs prior to a request by said plurality of said local caches.

21. A network caching method, comprising:

receiving, from a master cache via a satellite broadcast system, information content for storage at a local cache of a first internet service provider, said information content being forwarded by said master cache when a level of interest in said information content, as determined by said master cache, has reached a threshold level, said forwarding occurring prior to a request for said information content by said local cache.

* * * * *